United States Patent [19]
Lluch

[11] Patent Number: 6,103,278
[45] Date of Patent: Aug. 15, 2000

[54] LENTICULAR LOLLIPOP

[76] Inventor: Alex Lluch, 6347 Caminito Tenedor, San Diego, Calif. 92120

[21] Appl. No.: 09/301,881

[22] Filed: Apr. 29, 1999

Related U.S. Application Data

[60] Provisional application No. 60/115,605, Jan. 12, 1999.

[51] Int. Cl.[7] .................................................. A23G 3/00
[52] U.S. Cl. .......................... 426/9 D; 426/104; 426/134; 426/91; 446/219
[58] Field of Search .............................. 426/104, 91, 134, 426/132, 421, 106, 90; 446/219, 73, 71; 359/619, 620

[56] References Cited

U.S. PATENT DOCUMENTS

| | | | |
|---|---|---|---|
| 2,821,481 | 1/1958 | Moslo | 99/138 |
| 4,229,482 | 10/1980 | Kreske, Jr. | 426/134 |
| 4,668,523 | 5/1987 | Begleiter | 426/104 |
| 4,914,748 | 4/1990 | Schotter, IV et al. | 362/109 |
| 5,017,390 | 5/1991 | Sawant | 426/100 |
| 5,032,009 | 7/1991 | Chan | 446/175 |
| 5,042,860 | 8/1991 | Bouton | 294/5.5 |
| 5,066,502 | 11/1991 | Eales | 426/75 |
| 5,364,274 | 11/1994 | Sekiguchi | 434/365 |
| 5,451,181 | 9/1995 | Denoux | 446/465 |
| 5,525,383 | 6/1996 | Witkowski | 428/30 |

*Primary Examiner*—Milton Cano
*Assistant Examiner*—Sherry A. Dauerman
*Attorney, Agent, or Firm*—Marshall, O'Toole, Gerstein, Murray & Borun

[57] ABSTRACT

An edible assembly is provided with an edible portion composed of an edible material, a lenticular viewing element disposed within the edible portion, and a handle that supports the edible portion and the viewing element. The viewing element includes a first viewing side, a first image associated with the first viewing side and a second image associated with the first viewing side. The images are disposed so that the first image is visible when the first viewing side of the viewing element is disposed at a first viewing angle and so that the second image is visible when the first viewing side of the viewing element is disposed at a second viewing angle different than the first viewing angle. The viewing element may be a lenticular assembly having two lenticular sheets, each of which comprises a plurality of plastic grooves disposed over a plurality of images.

19 Claims, 2 Drawing Sheets

LENTICULAR LOLLIPOP

This application claims the benefit of U.S. Provisional application No. 60/115,605 filed Jan. 12, 1999, which is incorporated by reference herein in its entirety.

BACKGROUND OF THE INVENTION

The invention relates to a lollipop having a transparent edible material and a lenticular element disposed within the transparent edible material, the lenticular element having a plurality of images, each of which is viewable from a different viewing angle.

U.S. Pat. No. 2,821,481 to Moslo discloses a stick for ice cream bars and suckers. The stick has an upper portion with a small statuette associated therewith that is removable from the stick and a lower portion that is used as a handle. The Moslo patent discloses that the upper portion of the sucker stick may be enclosed in a briquette of transparent edible material so that a prospective customer can see the removable statuette within the transparent edible material.

U.S. Pat. No. 5,042,860 to Bouton discloses a support stick for an ice cream bar. As shown in FIG. 4 of the patent, the support stick may be in the form of a baseball bat and may have printed indicia thereon in the form of autographs of famous baseball players. The Bouton patent discloses that the support stick is disposed in an ice cream bar composed of an opaque material so that an autograph is not visible until the opaque ice cream has been eaten.

SUMMARY OF THE INVENTION

The invention is directed to an edible assembly having an edible portion composed of an edible material, a viewing element disposed within the edible portion, and a handle that supports the edible portion and the viewing element. The viewing element has a first image associated with one of its sides and a second image associated with the same side. The images are disposed so that the first image is visible only when the side of the viewing element is disposed at a first viewing angle and so that the second image is visible only when the side of the viewing element is disposed at a second viewing angle different than the first viewing angle.

The viewing element may be composed of a lenticular sheet which comprises a plurality of plastic grooves disposed over a plurality of images. The viewing element may also include a third image associated with its side, the third image being visible when the side of the viewing element is disposed at a third viewing angle that is different than the first and second viewing angles.

The viewing element may be enclosed by a transparent casing, and the handle may be integrally formed with the transparent casing which encloses the viewing element. Where the viewing element is composed of at least one lenticular sheet, the edible assembly may be provided as a lenticular lollipop that may be transformed into a lenticular toy by eating the edible portion of the lollipop disposed around the lenticular sheet. The lenticular lollipop may be provided with a lenticular assembly which has a pair of lenticular sheets.

The features and advantages of the present invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
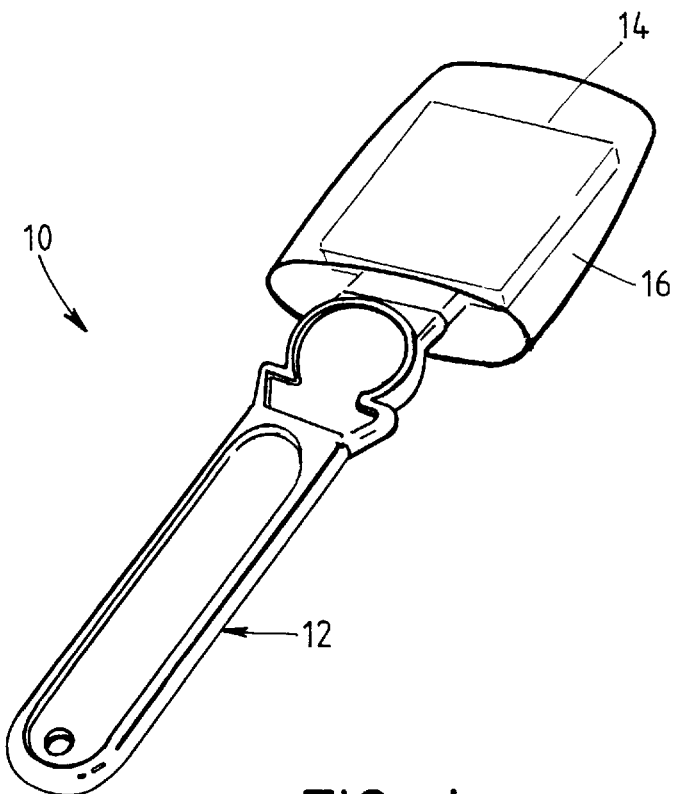
FIG. 1 is a perspective view of a preferred embodiment of a lenticular lollipop in accordance with the invention.

FIG. 1 illustrates a preferred embodiment of a lenticular lollipop 10 in accordance with the invention. Referring to FIG. 1, the lollipop 10 has a handle 12, a lenticular assembly 14, and a candy portion 16 which encloses the lenticular assembly 14. The candy portion 16 may be composed of any conventional, edible transparent material.

Figure 2:
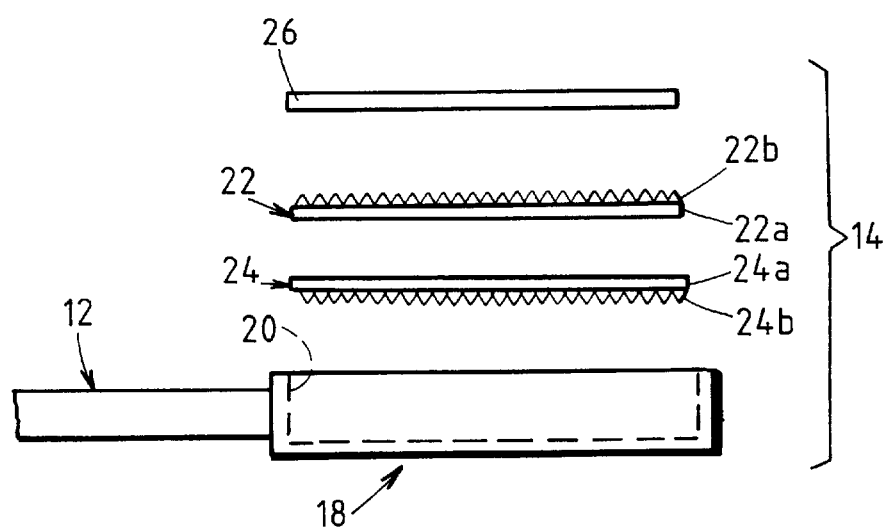
FIG. 2 is an exploded side view of a portion of the lenticular lollipop of FIG. 1.

As shown in FIG. 2, which is an exploded side view of the lenticular assembly 14, the lenticular assembly 14 may be composed of a clear plastic frame 18 having a hollow portion 20 in which a pair of conventional lenticular sheets 22, 24 are disposed. Each of the lenticular sheets 22, 24 may be composed of an image substrate 22a, 24a having a plurality of images formed thereon over which a sheet of clear plastic grooved material 22b, 24b is disposed. The lenticular assembly 14 may also have a clear plastic cover 26, which may be fixed to the plastic frame 18 to enclose the lenticular sheets 22, 24 therein. The cover 26 may be connected to the frame 18 in any conventional manner, such as by sonic welding, for example. The handle 12 may be attached directly to the lenticular assembly 14, such as by integrally forming the handle 12 with the plastic frame 18.

Figure 3:
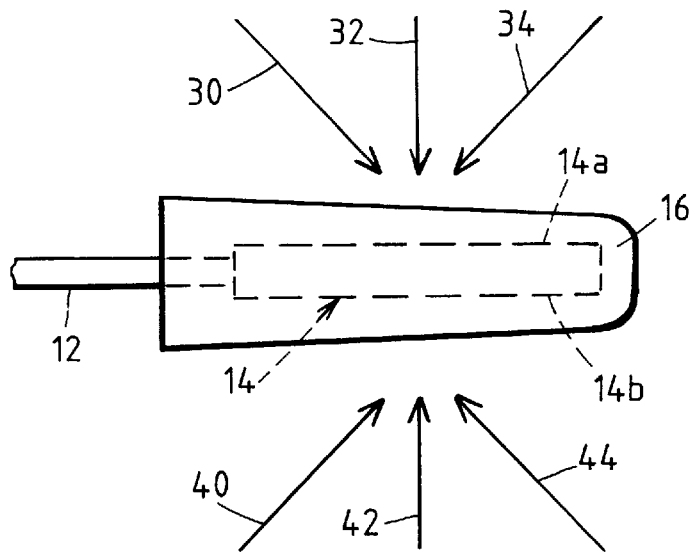
FIG. 3 is a side view of a portion of the lenticular lollipop of FIG. 1 showing six viewing angles.

Referring to FIG. 3, which is a side view of a portion of the lollipop 10, the lenticular assembly 14 has a first lenticular or viewing side 14a and a second lenticular or viewing side 14b opposite the first viewing side 14a. The viewing side 14a may be viewed from various viewing angles, including a first viewing angle designated by an arrow 30, a second viewing angle designated by an arrow 32, and a third viewing angle designated by an arrow 34. Similarly, viewing side 14b may be viewed from various viewing angles, including a first viewing angle designated by an arrow 40, a second viewing angle designated by an arrow 42, and a third viewing angle designated by an arrow 44.

Figure 4A:
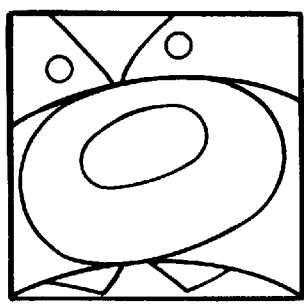
FIGS. 4A–4C illustrate three images that are visible when the lenticular lollipop is viewed from three of the viewing angles shown in FIG. 3.
Figure 4B:
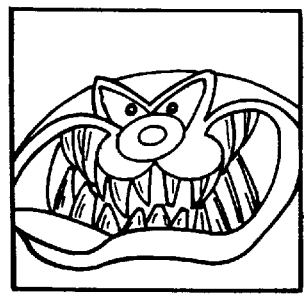
Figure 4C:
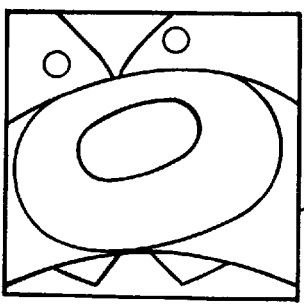

FIGS. 4A–4C show a plurality of visual images that are visible when the lenticular lollipop 10 is viewed from the viewing angles 30, 32, 34 shown in FIG. 3. In particular, FIG. 4A illustrates a first image 50 that is visible only when the first side 14a of the lenticular lollipop 10 is viewed from the viewing angle 30; FIG. 4B illustrates a second image 52 that is visible only when the first side 14a of the lenticular lollipop 10 is viewed from the viewing angle 32; and FIG. 4C illustrates a third image 54 that is visible only when the first side 14a of the lenticular lollipop 10 is viewed from the viewing angle 34.

Figure 5A:
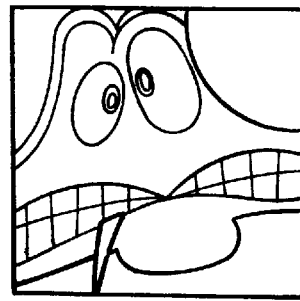
FIGS. 5A–5C illustrate three images that are visible when the lenticular lollipop is viewed from another three of the viewing angles shown in FIG. 3.
Figure 5B:
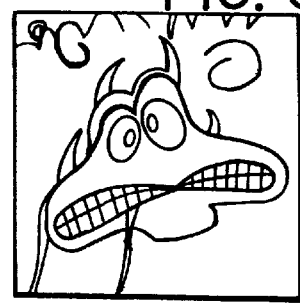
Figure 5C:
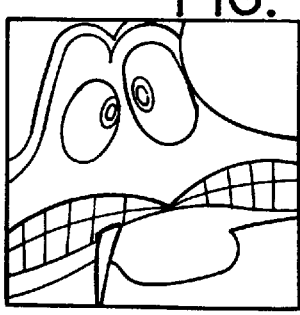

FIGS. 5A–5C show a plurality of visual images that are visible when the lenticular lollipop 10 is viewed from the viewing angles 40, 42, 44 shown in FIG. 3. In particular, FIG. 5A illustrates a first image 60 that is visible only when the second side 14b of the lenticular lollipop 10 is viewed from the viewing angle 40; FIG. 5B illustrates a second image 62 that is visible only when the second side 14b of the lenticular lollipop 10 is viewed from the viewing angle 42;

and FIG. 5C illustrates a third image 64 that is visible only when the second side 14b of the lenticular lollipop 10 is viewed from the viewing angle 44.

All of the visible images incorporated in the lenticular assembly 14 may be different, or some of the images may be the same. If some of the images are the same, it is preferred that at least two different images are associated with each of the lenticular sheets 22, 24 so that the desired lenticular effect is obtained. It should be appreciated that it is not necessary to include two lenticular sheets 22, 24 in the lollipop 10, each of which has multiple images; only a single lenticular sheet could be used.

Other types of lenticular sheets could be utilized. For example, lenticular sheets having up to eight or more different images, each of which is viewable exclusively from a slightly different viewing angle, could be used. In such a case, the image associated with each viewing angle could be slightly different than the images associated with the two adjacent viewing angles so that, as the lenticular sheet is viewed from a continuously changing viewing angle, the successive appearance (and disappearance) of each of the different images would give the perception of a moving image, like a cartoon or motion picture scene.

Referring to FIG. 2, in the manufacture of the lenticular lollipop 10, the handle 12 and the support frame 18 are formed, such as by being injection molded from clear plastic. The two lenticular sheets 22, 24 are cut to size and then placed back-to-back, or opposite each other, into the interior portion of the support frame 18. The cover 26 is then placed over the lenticular sheets 22, 24 and then attached to the support frame 18, such as by sonic welding. The resulting assembly forms a lenticular toy, which contains all components of the lenticular lollipop 10 except the edible material 16.

The manufacture of the lenticular lollipop 10 may be completed by placing the lenticular assembly 14 within a mold which contains transparent liquid edible material which subsequently hardens into the candy portion 16. Other ways of applying the edible material over the lenticular element 14 could be used.

The use of a transparent edible material is advantageous in that the images visible on the lenticular sheets 22, 24 may be viewed prior to the purchase of the lenticular lollipop 10 and while the lenticular lollipop 10 is being eaten. It should be appreciated that other edible materials could be used in the formation of the edible product, such as frozen edible materials typically used popsicles.

After the edible portion 16 has been eaten, the remaining lenticular assembly 14 and the handle 12 directly attached thereto form a lenticular toy, which can be played with by holding the lenticular assembly 14 at different viewing angles.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A lenticular lollipop, comprising:
   a candy portion composed of an edible, transparent candy material;
   a lenticular assembly disposed within said candy portion, said lenticular assembly comprising:
   a first lenticular sheet;
   a first image associated with said first lenticular sheet, said first image being visible exclusively when said first lenticular sheet of said lenticular assembly is disposed at a first viewing angle;
   a second image associated with said first lenticular sheet, said second image being visible exclusively when said first lenticular sheet of said lenticular assembly is disposed at a second viewing angle, said second viewing angle being different than said first viewing angle;
   a second lenticular sheet disposed opposite said first lenticular sheet;
   a first image associated with said second lenticular sheet, said first image of said second lenticular sheet being visible exclusively when said second lenticular sheet of said lenticular assembly is disposed at a first viewing angle; and
   a second image associated with said second lenticular sheet, said second image of said second lenticular sheet being visible exclusively when said second lenticular sheet of said lenticular assembly is disposed at a second viewing angle, said second viewing angle being different than said first viewing angle at which said second lenticular sheet is disposed; and
   a handle that supports said candy portion and said lenticular assembly.

2. The lenticular lollipop as defined in claim 1 wherein said lenticular assembly additionally comprises a transparent casing which encloses said lenticular sheets.

3. The lenticular lollipop as defined in claim 2 wherein said handle is integrally formed with said transparent casing which encloses said lenticular sheets.

4. The lenticular lollipop as defined in claim 1 wherein said lenticular assembly additionally comprises a third image associated with said first lenticular sheet, said third image being visible exclusively when said first lenticular sheet of said lenticular assembly is disposed at a third viewing angle, said third viewing angle being different than said first and second viewing angles.

5. The lenticular lollipop as defined in claim 4 wherein said third image of said first lenticular sheet is substantially the same as said first image of said first lenticular sheet.

6. The lenticular lollipop as defined in claim 1 wherein said first lenticular sheet comprises a plurality of plastic grooves disposed over a plurality of images.

7. A lenticular lollipop that is transformable into a lenticular toy, said lenticular lollipop comprising:
   a candy portion composed of an edible, transparent candy material;
   a lenticular assembly disposed within said candy portion, said lenticular assembly comprising:
   a lenticular sheet;
   a first image associated with said lenticular sheet, said first image being visible exclusively when said lenticular sheet of said lenticular assembly is disposed at a first viewing angle;
   a second image associated with said lenticular sheet, said second image being visible exclusively when said lenticular sheet of said lenticular assembly is disposed at a second viewing angle, said second viewing angle being different than said first viewing angle; and
   a transparent casing which encloses said lenticular sheet; and
   a handle attached directly to said lenticular assembly so that after said candy portion is eaten, said lenticular assembly and said handle form said lenticular toy.

8. The lenticular lollipop as defined in claim 7 wherein said handle is integrally formed with said transparent casing which encloses said lenticular sheet.

9. The lenticular lollipop as defined in claim 7 wherein said lenticular assembly additionally comprises a third image associated with said lenticular sheet, said third image being visible exclusively when said lenticular sheet of said lenticular assembly is disposed at a third viewing angle, said third viewing angle being different than said first and second viewing angles.

10. The lenticular lollipop as defined in claim 9 wherein said third image is substantially the same as said first image.

11. The lenticular lollipop as defined in claim 7 wherein said lenticular assembly additionally comprises:
   a second lenticular sheet;
   a first image associated with said second lenticular sheet, said first image of said second lenticular sheet being visible exclusively when said second lenticular sheet of said lenticular assembly is disposed at a first viewing angle; and
   a second image associated with said second lenticular sheet, said second image of said second lenticular sheet being visible exclusively when said second lenticular sheet of said lenticular assembly is disposed at a second viewing angle different than said first viewing angle at which said second lenticular sheet is disposed.

12. The lenticular lollipop as defined in claim 11 wherein said lenticular assembly additionally comprises a third image associated with said second lenticular sheet, said third image of said second lenticular sheet being visible exclusively when said second lenticular sheet of said lenticular assembly is disposed at a third viewing angle, said third viewing angle at which said second lenticular sheet is disposed being different than said first and second viewing angles at which said second lenticular sheet is disposed.

13. An edible assembly, comprising:
   an edible portion composed of an edible material;
   a lenticular viewing element disposed within said edible portion, said viewing element comprising:
      a first image associated with a side of said viewing element, said first image being visible only when said side of said viewing element is disposed at a first viewing angle; and
      a second image associated with said side of said viewing element, said second image being visible only when said side of said viewing element is disposed at a second viewing angle, said second viewing angle being different than said first viewing angle; and
   a handle that supports said edible portion and said viewing element.

14. The edible assembly as defined in claim 13 additionally comprising a transparent casing which encloses said viewing element.

15. The edible assembly as defined in claim 14 wherein said handle is integrally formed with said transparent casing which encloses said viewing element.

16. The edible assembly as defined in claim 13 wherein said viewing element additionally comprises a third image associated with said side of said viewing element, said third image being visible only when said side of said viewing element is disposed at a third viewing angle, said third viewing angle being different than said first and second viewing angles.

17. The edible assembly as defined in claim 14 wherein said handle is directly attached to said transparent casing.

18. The edible assembly as defined in claim 13 additionally comprising:
   a second viewing element;
   a first image associated with a side of said second viewing element, said first image of said second viewing element being visible when said side of said second viewing element is disposed at a first viewing angle; and
   a second image associated with said side of said second viewing element, said second image of said second viewing element being visible when said side of said second viewing element is disposed at a second viewing angle different than said first viewing angle at which said side of said second viewing element is disposed.

19. The edible assembly as defined in claim 18 wherein said second viewing element additionally comprises a third image associated with said side of said second viewing element, said third image of said second viewing element being visible when said side of said second viewing element is disposed at a third viewing angle, said third viewing angle at which said side of said second viewing element is disposed being different than said first and second viewing angles at which said side of said second viewing element is disposed.

* * * * *